(12) United States Patent
Franchuk et al.

(10) Patent No.: US 7,779,163 B2
(45) Date of Patent: Aug. 17, 2010

(54) MANAGEMENT OF EVENT ORDER OF OCCURRENCE ON A NETWORK

(75) Inventors: Brian A. Franchuk, Richfield, MN (US); Roger R. Benson, Eden Prairie, MN (US); Stephen A. Zielinski, Savage, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1569 days.

(21) Appl. No.: 10/936,629

(22) Filed: Sep. 8, 2004

(65) Prior Publication Data
US 2006/0080675 A1 Apr. 13, 2006

(51) Int. Cl.
G06F 15/16 (2006.01)
(52) U.S. Cl. ..................................................... 709/250
(58) Field of Classification Search ................... 709/250
See application file for complete search history.

(56) References Cited

U.S. PATENT DOCUMENTS

| 6,564,268 B1 * | 5/2003 | Davis et al. ................... 710/11 |
| 2002/0111812 A1 * | 8/2002 | Buchholz et al. ............ 704/278 |

* cited by examiner

*Primary Examiner*—Vivek Srivastava
*Assistant Examiner*—Xiang Yu
(74) *Attorney, Agent, or Firm*—Kinney & Lange, P.A.

(57) ABSTRACT

Devices in a process control system communicate by data messages over a communication medium segment. Each device includes a communication controller that maintains an order of occurrence of events received from and transmitted to a communication medium. The communication controller includes an order of occurrence identification (OOO_ID) counter and an event queue memory. The event queue memory sequentially stores an event type identifier for each event that is processed by the communication controller. The OOO_ID counter provides an OOO_ID to associate with each event type identifier.

15 Claims, 6 Drawing Sheets

MANAGEMENT OF EVENT ORDER OF OCCURRENCE ON A NETWORK

BACKGROUND OF THE INVENTION

The present invention relates to a communications controller for use in field instruments and other devices of process control systems. In particular, the present invention is a system and method managing an order of occurrence of events in a communications controller.

In a typical industrial plant, a distributed control system (DCS) is used to control many of the industrial processes performed at the plant. Typically, the plant has a centralized control room having a computer system with user I/O, disc I/O, and other peripherals as are known in the computing art. Coupled to the computing system are a controller and a process I/O subsystem.

The process I/O subsystem includes a plurality of I/O ports which are connected to various field devices throughout the plant. Field devices known in the control art include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, and indicator lights. As used herein, the term "field device" encompasses these devices, as well as any other device that performs a function in a distributed control system and is known in the control art.

Traditionally, analog field devices have been connected to the control room by two-wire twisted pair current loops, with each device connected to the control room by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 milliamps running through the loop. An analog field device that transmits a signal to the control room modulates the current running through the current loop, with the current proportional to the sensed process variable. On the other hand, an analog field device that performs an action under control of the control room is controlled by the magnitude of the current through the loop, which is modulated by the I/O port of the process I/O system, which in turn is controlled by the controller. Traditional two-wire analog devices having active electronics can also receive up to 40 milliwatts of power from the loop. Analog field devices requiring more power are typically connected to the control room using four wires, with two of the wires delivering power to the device. Such devices are known in the art as four-wire devices and are not power limited, as are two-wire devices.

In contrast, traditional discrete field devices transmit or respond to a binary signal. Typically, discrete field devices operate with a 24-volt signal (either AC or DC), a 110- or 240-volt AC signal, or a 5-volt DC signal. Of course, a discrete device may be designed to operate in accordance with any electrical specification required by a particular control environment. A discrete input field device is simply a switch which either makes or breaks the connection to the control room, while a discrete output field device will take an action based on the presence or absence of a signal from the control room.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve between an open and closed position, inclusive, based on the magnitude of the current flowing through the two-wire twisted pair.

More recently, hybrid systems that superimpose digital data on the current loop have been used in distributed control systems. One hybrid system is known in the control art as the Highway Addressable Remote Transducer (HART) and is similar to the Bell 202 modem specification. The HART system uses the magnitude of the current in the current loop to sense a process variable (as in the traditional system), but also superimposes a digital carrier signal upon the current loop signal. The carrier signal is relatively slow, and can provide updates of a secondary process variable at a rate of approximately 2-3 updates per second. Generally, the digital carrier signal is used to send secondary and diagnostic information and is not used to realize the primary control function of the field device. Examples of information provided over the carrier signal include secondary process variables, diagnostic information (including sensor diagnostics, device diagnostics, wiring diagnostics, and process diagnostics), operating temperatures, temperature of the sensor, calibration information, device ID numbers, materials of construction, configuration or programming information, etc. Accordingly, a single hybrid field device may have a variety of input and output variables and may implement a variety of functions.

HART is an industry standard nonproprietary system. However, it is relatively slow. Other companies in the industry have developed proprietary digital transmission schemes which are faster, but these schemes are generally not used by or available to competitors.

More recently, a newer control protocol has been defined by the Instrument Society of America (ISA). The new protocol is generally referred to as fieldbus. Fieldbus is a multi-drop serial digital two-way communications protocol intended for connecting field instruments and other process devices such as monitoring and simulation units in distributed control systems. Fieldbus allows enhanced digital communication over previous process control loop methods while maintaining the ability to power process devices coupled to the fieldbus loop and while meeting intrinsic safety requirements.

Two reasonably standardized industrial fieldbus protocols are Foundation Fieldbus and Profibus. The physical layer of the fieldbus protocols are defined by Instrument Society of America standard ISA-S50.02-1992, and its draft two extension dated 1995. The fieldbus protocol defines two subprotocols. An H1 fieldbus network transmits data at a rate up to 31.25 kilobits per second (Kbps) and provides power to field devices coupled to the network. The H1 physical layer subprotocol is defined in Clause 11 of the ISA standard, part two approved in September 1992. An H2 fieldbus network transmits data at a rate up to 2.5 megabits per second (Mbps), does not provide power to field devices connected to the network, and is provided with redundant transmission media.

Fieldbus provides significant capabilities for digitally communicating immense amounts of process data. Thus, there is a continuing need to develop process control devices capable of maximizing fieldbus communication effectiveness.

BRIEF SUMMARY OF THE INVENTION

The present invention is a communication controller for use in a device for maintaining an order of occurrence of events received from and transmitted to a communication medium. The communication controller includes an order of occurrence identification (OOO_ID) counter and an event queue memory. The event queue memory sequentially stores an event type identifier for each event that is processed by the communication controller. The OOO_ID counter provides an OOO_ID to associate with each event type identifier.

In a preferred embodiment, the communication controller further includes a plurality of timer OOO_ID registers. Each timer OOO_ID register is associated with an order of occurrence (OOO) timer in the communication controller. When one of the OOO timers expires, the current value of OOO_ID from the OOO_ID counter is stored in its associated timer OOO_ID register. Software determines the order of occurrence between an event and the expiration of an OOO timer by comparing the OOO_ID value of the event with the OOO_ID stored in the timer OOO_ID register.

DETAILED DESCRIPTION

Process Control System Overview

The present invention relates to a communication controller for use in field instruments and other devices of process control systems. The purpose of the communication controller is to perform a substantial portion of the link layer processing of messages and timer management, thereby freeing the application processor or CPU to perform other functions. For the purpose of this detailed description, the communication controller will be described in the context of a system using the Foundation Fieldbus communications protocol, although it has general applicability to packet-based communication protocols.

The fieldbus physical layer defines the electrical characteristics of the physical means of transmission and reception of the communications protocol data in the form of a Physical Layer Protocol Data Unit (PhPDU). In addition, the fieldbus physical layer specifies the symbol encoding, message framing, and error detection method. The ISA fieldbus standard defines three signaling speeds and two modes of coupling. For purposes of this description, the invention will be described in the context of the H1 physical layer defined in clause 11 of ISA S50.02 Standard, Part 2. That clause covers a 31.25 Kbps, voltage mode, wire medium, with a low-power option. This option allows for a device connected to the communications medium to receive its operational power from the communications medium. The physical layer can be capable of meeting the intrinsic safety requirements for hazardous environments. The protocol operates on low-grade twisted pair cable and supports multiple devices, in accordance with the voltage and current limitations which are defined by the standard.

Figure 1:
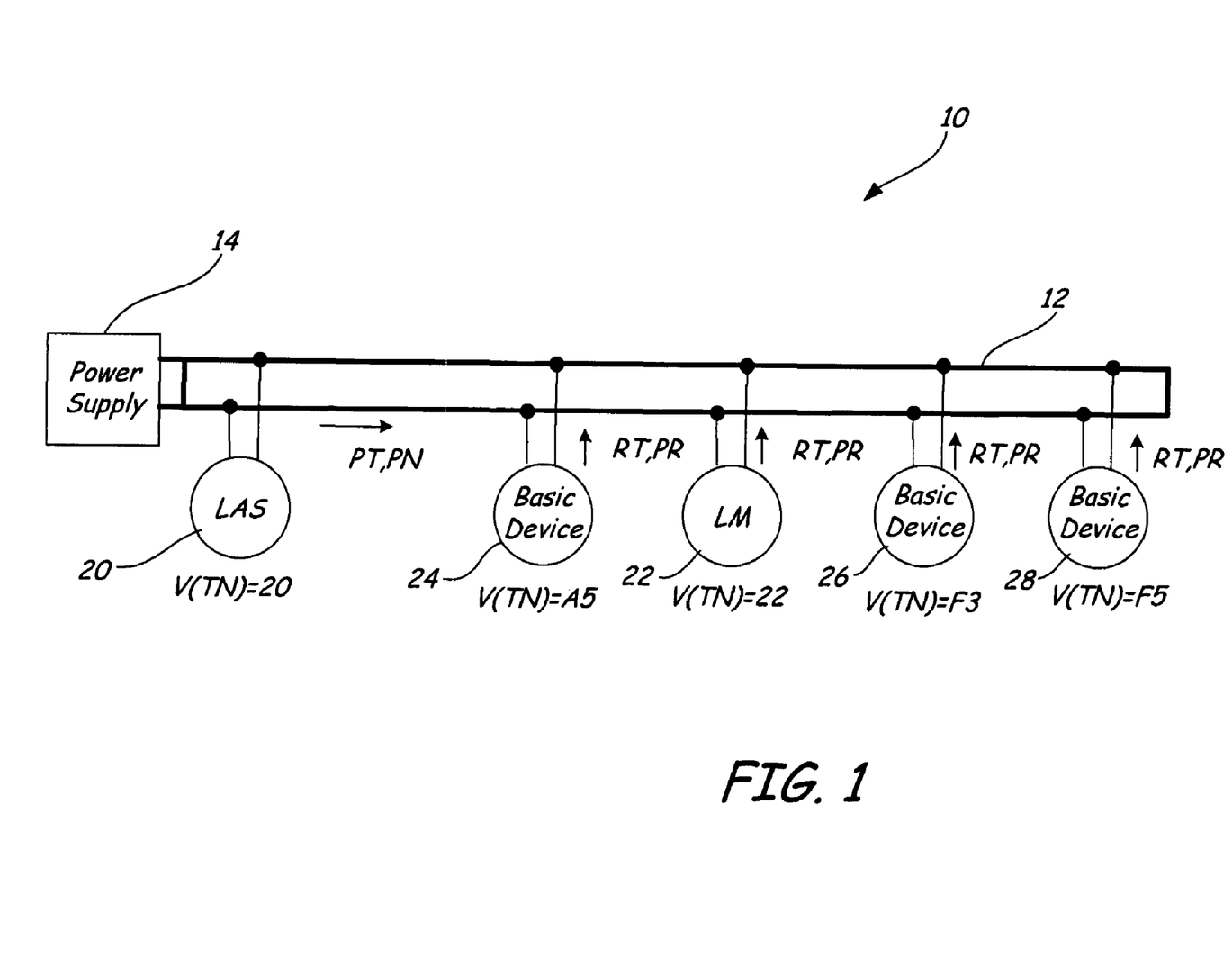
FIG. 1 is a diagram of a process control system with digital communication between devices over a communication medium segment.

FIG. 1 shows a typical process control system 10 including segment 12, power supply 14 and five devices: Link Active Scheduler (LAS) device 20, Link Master (LM) device 22, and basic devices 24, 26, and 28. Segment 12 can support up to thirty-two devices on a single pair of wires. Typically, segment 12 will have from four to sixteen devices, based on loop execution speed, power, and intrinsic safety requirements.

LAS device 20 maintains a central schedule for all the communication between devices on segment 12. LAS device 20 improves the overall communication reliability by sending Compel Data (CD) Data Link Protocol Data Units (DLPDUs) to each device to transmit back cyclic data which is then scheduled to do so. LAS device 20 serves as the local source of Data Link time (DL-time) on segment 12. A DLPDU is the data content of the PhPDU message that is communicated across segment 12.

LM device 22 is configured to take over the responsibilities of LAS device 20 should LAS device 20 fail or become inoperable. Although only LM device 22 is shown in FIG. 1, more than one Link Master device can be present on a segment. This allows for the case if both the Link Active Scheduler and the first Link Master were to fail, then the second Link Master can take over for the Link Active Scheduler. Once the Link Active Scheduler is disabled, the Link Master takes over the functionality of the Link Active Scheduler.

Each device has a unique address called the V(TN), which represents the local node-ID(This_Node). In the example shown in FIG. 1, LAS device 20 has an address V(TN)=20; LM device 22 has address V(TN)=22; basic device 24 has address V(TN)=A5; basic device 26 has address V(TN)=F3; and basic device 28 has address V(TN)=F5.

LAS device 20 sends Pass Token (PT) and Probe Node (PN) messages to all devices on segment 12. Each of the other devices (LAS device 22 and basic devices 24, 26, 28) send Return Token (RT) and Probe Response (PR) messages back to LAS device 20, as appropriate.

Each basic device 24, 26, 28 only needs to see its own PT and PN messages that are sent by LAS device 20. PT and PN messages have a designation address (DA) encoded in the second byte of the DLPDU. LAS device 20 passes a token (PT) or probes a node (PN) one at a time to all devices on segment 12.

Once basic device 24, 26, or 28 receives a PT message with a designation address equal to that device's unique address (DA=V(TN)), it then will respond back to LAS device 20 with an RT message. If basic device 24, 26, or 28 receives a PN DLPDU with DA=V(TN), it is required to respond back with a PR message.

The transmission of PT and PN messages from LAS 20 and RT and PR messages to LAS 20 creates several messages on segment 12 that a particular basic device 24, 26, 28 does not need to receive and take action on. Each basic device 24, 26, 28 only needs to respond to PT and PN messages addressed to that particular device. Constantly getting interrupted by PT and PN messages from LAS 20 that are addressed to other devices, as well as RT and PR messages from other devices addressed to LAS device 20, can create undue processing time to handle these "nuisance interrupts." With basic devices 24, 26, and 28, DLPDU filtering can be used to reduce the number of interrupts that the basic device has to process. On the other hand, LAS device 20 must process every message on segment 12.

All devices on segment 12 transmit data onto segment 12 as a Manchester encoded baseband signal. With Manchester encoding, "0" and "1" are represented by transitions that occur from low-to-high and high-to-low, respectively, in the middle of the bit period. For fieldbus, the nominal bit time is 32 microseconds (μsec), with the transition occurring at 16 μsec. The Manchester encoding rules have been extended to include two additional symbols, non-data plus (N+) and non-data minus (N−), wherein no transition occurs during the bit period and the Manchester encoded baseband signal remains high (N+) or low (N−).

Message Format

Figure 2:
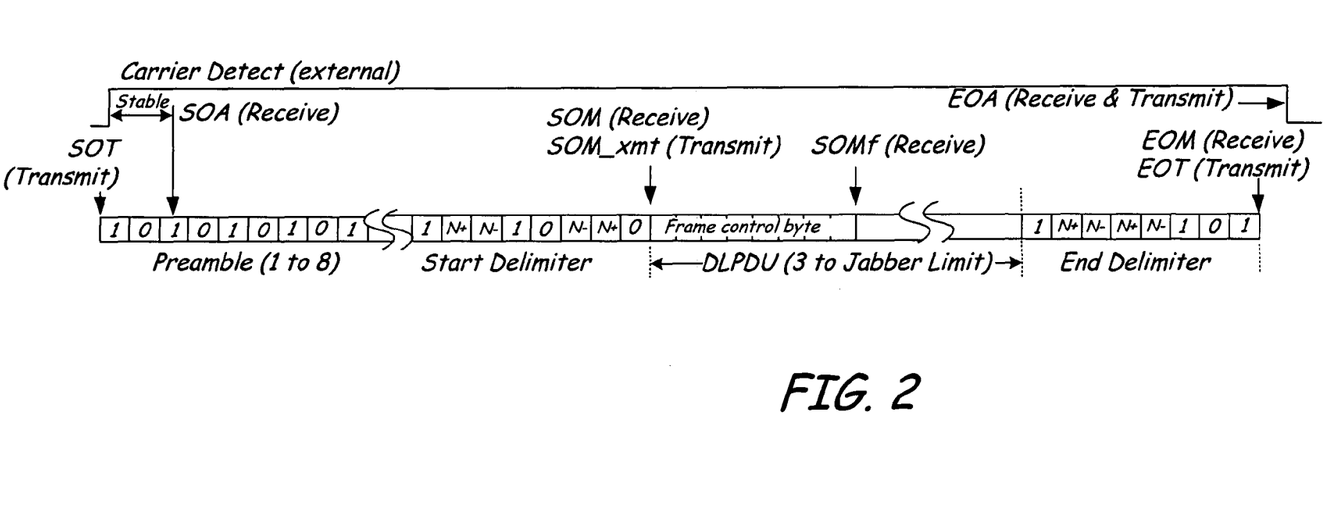
FIG. 2 shows a message format for communications between devices of the process control system of FIG. 1.

FIG. 2 shows the format of a Physical Layer Protocol Data Unit (PhPDU) used to transmit messages over segment 12. The PhPDU includes a preamble, a Start Delimiter (SD) a Data Link Protocol Data Unit (DLPDU) and an End Delimiter (ED). The preamble is the first several bits of the PhPDU message. The fieldbus specification allows for one to eight bytes of preamble. The device receiving the message uses the preamble to synchronize with the incoming message. As shown in FIG. 2, the sequence of the first byte of the preamble is 1 0 1 0 1 0 1 0.

The Start Delimiter (SD) immediately follows the preamble. There is one SD per message. The fieldbus specification requires that the SD have non-character data (N+ and N−), which always appear in the SD message in complementary pairs. This encoding scheme makes the SD unique and impossible to confuse with the data portion (DLPDU) of the message. The sequence shown in FIG. 2 for the SD is 1 N+ N− 1 0 N− N+ 0.

The DLPDU is a variable length message. It contains a Frame Control (FC) byte as its first byte and a Frame Check Sequence (FCS) check sum as its final two bytes. The length of DLPDU is variable, with a minimum of three bytes (in the case of an RT message) up to a jabber limit of, for example, about 300 bytes.

The End Delimiter (ED) follows the DLPDU. It represents the last byte of any PhPDU message transmitted over segment 12. Similar to the SD, the ED includes non-character data in complementary pairs. This encoding scheme makes the ED unique and impossible to confuse with the DLPDU. The sequence shown in FIG. 2 for the End Delimiter is 1 N+ N− N+ N− 1 0 1.

FIG. 2 also shows a Carrier Detect signal. The purpose of the Carrier Detect signal is to indicate when (a) an incoming PhPDU message is present on segment 12 or (b) a device is transmitting a message onto segment 12.

Start of Transmit (SOT) occurs at the moment that a Transmit Enable (TxE) goes active, i.e., when the preamble of a PhPDU message is first presented to segment 12.

Start of Activity (SOA) occurs after the Carrier Detect signal goes active and has been stable for at least one bit time or two bit times (approximately 16 to 32 μsec). This time depends on when the Carrier Detect goes active with respect to the internal clock of the device receiving the message. This allows the communication controller of the device to ignore noise glitches that are most apt to occur at the front end of the preamble. Additional time is used to synchronize with the bit boundaries to eliminate the potential for short noise bursts on segment 12 being misinterpreted as activity. For a transmitted message, SOA occurs once the Transmit Enable goes active (i.e., the preamble of the PHPDU is presented to segment 12).

Start of Message (SOM) occurs at the beginning of the first bit of when the FC byte is detected for a received message.

SOM_xmt is the Start of Message Transmit, which occurs at the beginning of the first bit of when the FC byte is detected for a transmitted message.

SOMf is an SOM of a received filtered DLPDU. This occurs when the communication controller within the device has detected enough information to make the determination that the incoming message is to be filtered.

End of Message (EOM) occurs at the end of the last bit of the ED being encountered in a received message. End of Transmission (EOT) occurs at the end of the last bit of the ED a transmitted message.

End of Activity (EOA) occurs when the Carrier Detect has gone inactive. The EOA occurs for both transmitted and received DLPDUs.

Device Architecture

Figure 3:
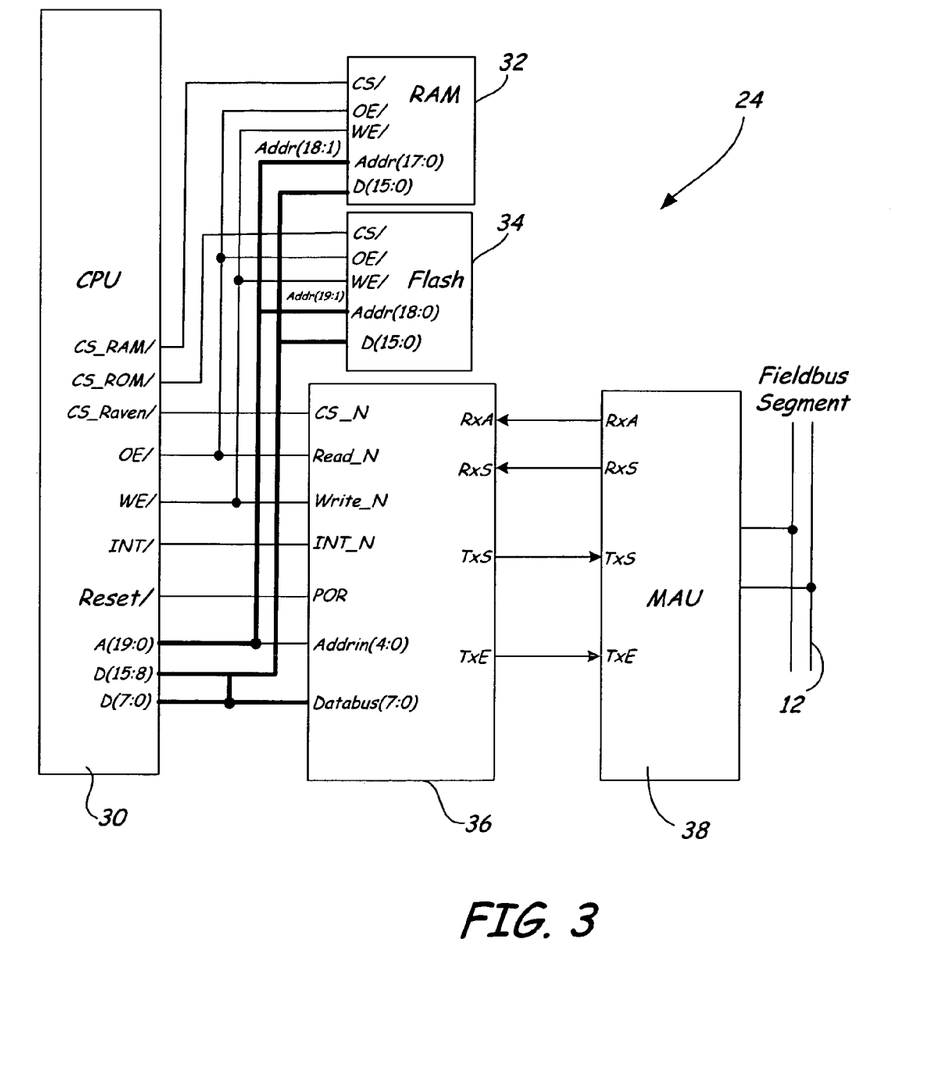
FIG. 3 is a block diagram of a device of the process control system.

FIG. 3 shows a block diagram of the communications portion of basic device 24, which is representative of the architecture in each of devices 20-28. Basic device 24 includes central processing unit (CPU) 30, random access memory (RAM) 32, flash memory 34, communications controller 36, and medium attachment unit (MAU) 38.

In the embodiment shown in FIG. 3, CPU 30 is a microprocessor such as Motorola 68LC302, Motorola Mcore 2075, Motorola PowerPC 850, Atmel Thumb processor AT91M40800 and others. CPU 30 is an 8-bit or higher processor.

In the embodiment shown in FIG. 3, communication controller 36 is an application specific integrated circuit (ASIC) chip that serves as an interface between MAU 38 and CPU 30. It transmits and receives encoded Manchester data to and from external analog circuitry connected to fieldbus segment 12. After receiving the serial data from MAU 38, communication controller 36 decodes the data, forms the data into bytes, strips off the preamble, SD, and ED, (and, optionally, the FCS bytes) and provides the message data for the link layer to read. For data transmission, communication controller 36 receives bytes of DLPDU data from the link layer and adds the preamble, the SD, optionally generates the FCS, and adds the ED. Communication controller 36 then forms serially encoded Manchester data, which is sent to MAU 38 for transmission on fieldbus segment 12.

Communication between communication controller 36 and MAU 38 is provided through four signals: RxS, RxA, TxS, and TxE. RxS is the received Manchester Encoded serial data. RxA is the Carrier Detect signal for received data. TxS is the transmitted encoded serial data. TxE is the transmit enable signal.

In other embodiments of the invention, communication controller 36 can be formed on a common integrated circuit with CPU 30. In addition, RAM 32 and flash memory 34 may also be combined with CPU 30 in some embodiments. In the case of LAS device 20, CPU 30, RAM 32 and flash memory 34 may be a part of a host computer system of process control system 10.

MAU 38 provides the network connection to Fieldbus segment 12. MAU 38 may be an integrated circuit, or discrete components can be used to form MAU 38.

Communication Controller 36

Figure 4:
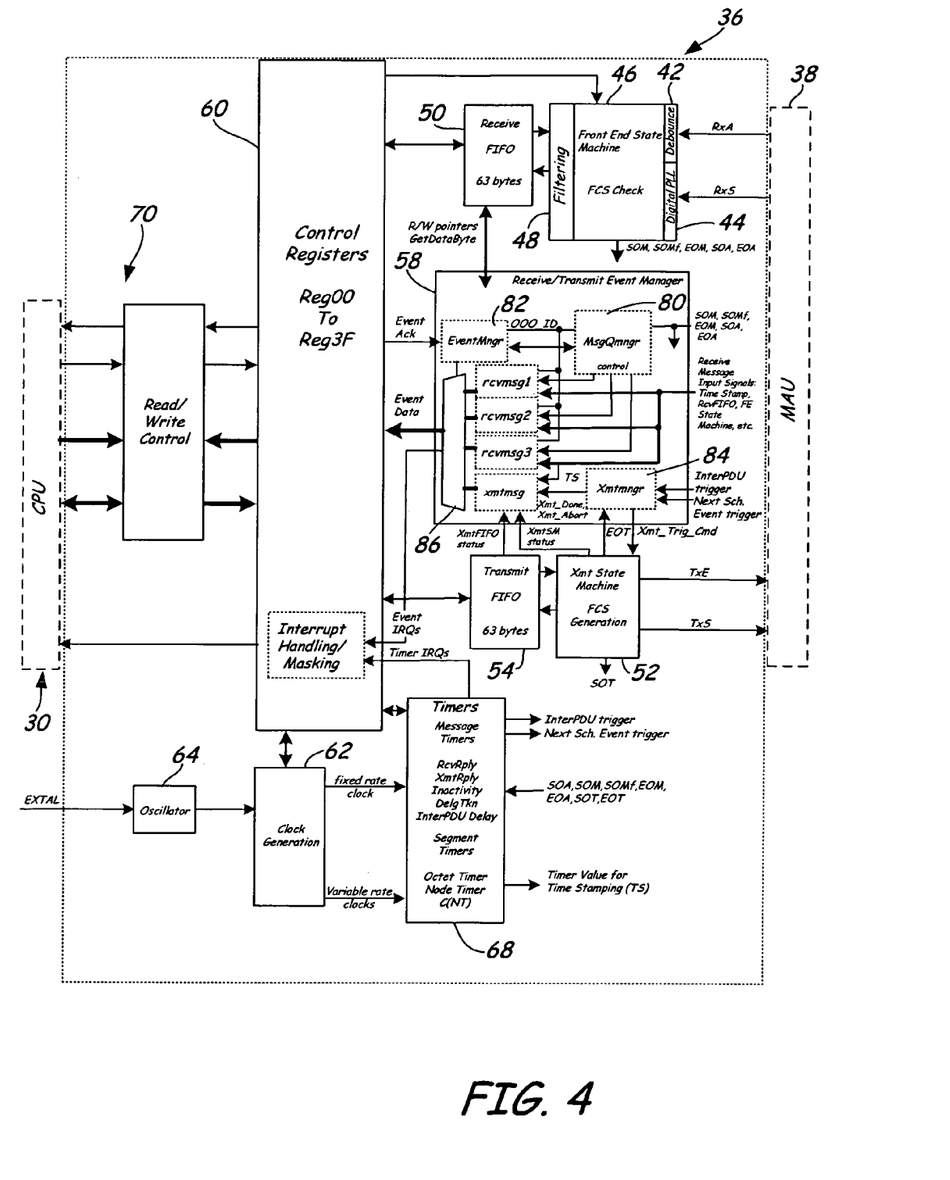
FIG. 4 is a functional block diagram of a communication controller of the device of FIG. 3.

FIG. 4 is a functional block diagram of communication controller 36. In this embodiment, communication controller 36 includes debounce circuit 42, digital phase lock loop (PLL) 44, front end state machine 46, receive message filtering 48, receive first-in-first-out (FIFO) memory 50, transmit state machine 52, transmit FIFO memory 54, transmit driver circuitry 56, receive/transmit event manager 58, registers 60, clock generation circuitry 62, oscillator 64, timers 68, and CPU interface circuitry 70.

When an incoming message is detected by MAU 38, a Carrier Detect signal is provided to communication controller 36 at the RxA input, and the incoming asynchronized Manchester data is provided at the RxS input. The RxA and RxS inputs are presented to front end state machine 46. Digital PLL 44 recovers and regenerates the clock from the incoming serial Manchester encoded data. This regenerated clock is then used to clock front end state machine 46.

Front end state machine 46 detects the incoming serial bit stream RxS. It strips off the preamble, SD, and ED, and stores the DLPDU into receive FIFO memory 50. Front end state machine 46, together with receive message filtering 48, can be configured to filter out specific frame controls, plus Probe Node (PN) and Pass Token (PT) messages addressed to other devices. Front end state machine 46 keeps track of the number of bytes that have been written into receive FIFO memory 50. The FCS is automatically verified at the end of each message, and can be optionally stored into receive FIFO memory 50.

Front end state machine 46 also provides signals representing specific events it has detected. These include the SOM, SOMf, EOM, SOA, and EOA event pulses.

Front end state machine 46 is activated when the RxA line goes active. Front end state machine 46 then synchronizes with the edges of the preamble field and decodes the Manchester encoded data of the RxS signal. The SOA event indicates that front end state machine 46 has started.

Once the preamble has been detected, front end state machine 46 waits for the Start Delimiter (SD) sequence. After the SD has been detected, front end state machine 46 converts the serial data stream into octets, and writes them to receive FIFO memory 50 in 8-bit bytes. Front end state machine 46 continues writing new octets of data into receive FIFO memory 50 until the End Delimiter (ED) is detected, or until receive FIFO memory 50 is full.

When the ED has been detected, front end state machine 46 waits for the RxA line to go inactive, which is indicated by the EOA event.

With the RxA line inactive, front end state machine 46 returns to its initial state. It remains in that initial state until the next activity on fieldbus segment 12 (i.e., until a Carrier Detect signal is provided at RxA again).

Filtering circuitry is used for basic devices, to reduce IRQ loading on messages that are not important to the device. In contrast, a device configured as an LAS must receive all messages on the segment and therefore must have filtering disabled. When filtering is disabled, all received messages will be stored in receive FIFO memory 50 and will be passed on to registers 60 and then to CPU 30. SOMf is a Start Of Message signal for a received filtered DLPDU. It occurs when front end state machine 46 has determined that the received message has detected enough information to determine that the incoming message is to be filtered.

With filtering enabled, messages that are filtered are not stored in received FIFO memory 50. For filtered messages, SOMf will not be generated, therefore no event or IRQ will occur.

Examples of filtered messages are Return Token (RT), idle, Request Interval (RI) and Probe Response (PR) DLPDU messages will always be rejected. These are identified based upon the Frame Control (FC) byte. Pass Token (PT) and Probe Node (PN) messages will be accepted if the destination address in the message matches the address for the device. If the destination address does not match, then the PT and PN messages are rejected.

The ability to filter message types based on the FC byte and based upon the destination address reduces the software interrupt loading by limiting the number of interrupt requests (IRQs) that CPU 30 must process.

Front end state machine 46 and receive FIFO memory 50 are used to parse the serial data frames from MAU 38. CPU 30 reads the data from receive FIFO memory 50 and places it in its local memory space to decode the received DLPDU.

Receive FIFO memory 50 is 63 bytes by eight bits wide. Receive FIFO memory 50 will store all of the DLPDU bytes up to three complete received messages (up to a total of 63 bytes). Front end state machine 46 decodes the serial data stream from the filtered RxS signal, and converts it to an 8-bit parallel formatted byte. After the formation of the byte, front end state machine 46 creates a write pulse that stores the coded data into the location that is pointed to by a write pointer. After the write operation is complete, the write pointer is incremented to store the next DLPDU byte.

CPU 30 interfaces with a read pointer to receive FIFO memory 50. Any read from the receive FIFO register of registers 60 (which contains the actual DLPDU data) places the 8-bit data from receive FIFO memory 50 immediately onto the data bus for reading by CPU 30. After the read operation is complete, the read pointer is incremented. This can be continued until receive FIFO memory 50 is empty.

To prevent an overflow condition from occurring in receive FIFO memory 50, there is a register within registers 60 that allows an IRQ to be generated if receive FIFO memory 50 is approaching a full condition. The threshold for generating the IRQ is configurable.

Transmit state machine 52 reads the DLPDU data to be transmitted from transmit FIFO memory 54. The preamble, SD, and ED are automatically inserted. To start transmit state machine 52, the interPDU trigger or, optionally, the Next Scheduled Event trigger needs to be activated to commence the transmit operation. Transmit state machine 52 keeps track of the number of bytes that have been transmitted. An error status will be indicated if there is an underflow or transmitted count violation. The FCS can be optionally transmitted automatically as the last two bytes of the DLPDU.

Transmit state machine 52 encodes the Manchester serial data supplied through interface circuitry 70 on the TxS line to MAU 38 to be presented on fieldbus segment 12. Transmit state machine 52 also asserts the Transmit Enable (TxE) line at the instant that the first bit the first preamble is sent until the last bit of the ED occurs. Transmit state machine 52 also generates the Start Of Transmission (SOT) event signal when it asserts the TxE line, and generates the End Of Transmission (EOT) event signal when the TxE line returns to inactive.

Transmit FIFO memory 54 will store all of the DLPDU bytes that are required for a message to be transmitted, up to a total of 63 bytes. A configurable threshold can be set to send an IRQ telling CPU 30 when transmit FIFO memory 54 is almost empty. In that way, if more than 63 bytes are required to be transmitted, CPU 30 is notified so that it can add more data to transmit FIFO memory 54. This continues until all DLPDU bytes have been written. CPU 30 writes to transmit FIFO memory 54 using a write pointer, while transmit state machine 52 reads bytes from transmit FIFO memory 54 using a read pointer.

Communication controller 36 works on events, and must be capable of handling the occurrence of multiple events. Examples of events include an SOM, EOM, or EOA for a received message or an EOT for a transmitted message. Receive/transmit event manager 58 manages all of the events that occur for up to a total of three received messages and one transmitted message.

As shown in FIG. 4, receive/transmit manager 58 includes three received message objects labeled rcvmsg1, rcvmsg2, and rcvmsg3, and one transmit message object labeled xmtmsg. In addition, receive/transmit manager 58 includes message queue manager (MsgQmngr) 80, event manager (EventMngr) 82, transmit manager (xmtmngr) 84, and event MUX 86.

Receive FIFO memory 50 is capable of storing the DLPDU bytes for up to three complete received messages. Each of those three messages has a corresponding object rcvmsg1, rcvmsg2, and rcvmsg3. Each object contains the status of all of the IRQs, message errors, and time stamping that occur for its corresponding received message. This information constitutes the event data for that message.

The status of all IRQs, message errors, and time stamping that occur for a transmit message are stored in the xmtmsg object. The stored information constitutes the event data for the transmitted message.

MsgQmngr 80 controls the selection and the enabling of the three received messages. Only one rcvmsg object can be active at a time. MsgQmngr 80 allows the events to be associated with the active received message. In the case of a fourth message being received before the other three messages have been acknowledged by CPU 30, MsgQmngr 80 disables any further messages from being received until the event data has been read or acknowledged.

EventMngr 82 manages the order of occurrence of events. As events occur, event manager 82 assigns each event an order of occurrence identification (OOO_ID). This allows CPU 30 to read the events one at a time as they occur. CPU 30 must acknowledge each event as it occurs. After the first event has been acknowledged, the subsequent event will be ready for CPU 30 to read.

Xmtmngr 84 monitors the InterPDU trigger (InterPDU_trig) and the Next Scheduled Event trigger and initiates the Transmit Trigger Command (Xmt_Trig_Cmd) to transmit state machine 52 to cause the next message to begin to be transmitted.

Communication controller 36 includes registers 60. These registers designated REG00-REG3F can be written to and read from by CPU 30. Interrupts (IRQs) are also handled through registers 60.

Clock generation circuitry 62 receives an external clock and either uses that clock or the clock signals from its internal oscillator 64 to generate all necessary clock signals for communication controller 36.

Clock generation circuitry 62 preferably has the capability of currently adjusting both its node timer and its octet timer clock rates. This allows communication controller 36 to synchronize the relationship of its Node Time with the Link Address Scheduler (LAS 20). Octet Time is used for internal message timing, while Node Time is used to share a common sense of time across fieldbus segment 12.

Timer 68 will be divided into two groups, representing different senses of time. A first set of timers called segment timers, operate based on a variable clock rate produced by clock generation circuitry 62 under software control from CPU 30. A second set of timers, called message timers, operates on a fixed rate clock.

There are two segment timers in communication controller 36. The first segment timer is a Node timer, which has a clock tick rate of 31.25 μsec (32 kHz). The Node timer is used to implement the Next Function Block Execution Time, Link Schedule Time V (LST), and Data Link Time (DL-Time).

The second segment timer is the Octet Timer, which has a clock tick rate of 2 μsec (500 kHz). The Octet Timer is used for the Next Scheduled Event trigger (which interfaces to transmit state machine 52 for transmitting messages at a specific time). When the clock rate is adjusted, the Node and Octet timers will track one another at the same rate. This is because the clock signals driving the Node timer and the Octet timer are derived from a common variable clock.

The message timers are started and stopped based upon fieldbus message events (transmit and receive). The message timers include an inactivity timer, an interPDU delay timer, a receive reply timer, a transmit reply timer, a delegated token recovery timer.

The inactivity timer is a decrementing counter. It is used for measuring the idle time between two PhPDUs. The inactivity timer works on both filtered and non-filtered received messages as well as any transmitted messages on fieldbus segment 12. When commanded to start, the inactivity timer will decrement every 16 μsec. The inactivity timer starting point is determined from a configurable preloaded set point loaded into one of registers 60. The decrementing of the inactivity timer can be cancelled or stopped via events that are related to either a received or transmitted message. If the timer ever reaches 0 or expires, an IRQ will be generated. The inactivity timer will remain at 0 until the IRQ is acknowledged. If the IRQ remains high, no additional message events that occur will effect the inactivity timer until this IRQ is acknowledged.

The interPDU delay timer is an incrementing counter. It is used in conjunction with a V(MID) threshold register to implement the fieldbus V(MID) minimum-interPDU delay that insures a minimum time duration (or gap time) of non-transmission between a transmitted or received message. The interPDU timer is affected by both filtered and non-filtered received messages as well as any transmitted messages on the fieldbus segment. When there is no fieldbus activity, the interPDU timer will continuously increment. Once the count value equals or exceeds a predetermined value stored in a register 60, the InterPDU_trig signal will go active. This signal is used for determining that the interPDU delay time has been met. This signal interfaces to xmtmngr 84 to give the command that a transmitted DLPDU can commence.

The receive reply timer is a decrementing counter. It is used to allow a subscribing device to monitor for an immediate response to a Compel Data (CD) DLPDU. It is also used for a device to monitor its own address when coming on line. When commanded to start, the receive reply timer will decrement every 16 μsec. The receive reply timer starting point is determined from a configurable preloaded 16-bit set point loaded into one of registers 60. The decrementing of the receive reply timer can be cancelled or stopped via either a SOM or SOT event. If the receive reply timer ever reaches 0 or expires, an IRQ will be generated. The receive reply timer requires that the IRQ be enabled for the IRQ to be generated. The receive reply timer will remain at 0 until the IRQ is acknowledged. If the IRQ remains high, no additional message events that occur will affect the receive reply timer until this IRQ is acknowledged.

The transmit reply timer is a decrementing counter. It allows a device to monitor for an immediate response after transmitting one of several DLPDUs (e.g., compel data, pass token). When commanded to start, the transmit reply timer will decrement every 16 μsec. The transmit reply timer starting point is determined from a configurable preloaded set point loaded into one of registers 60. The decrementing of the transmit reply timer can be cancelled or stopped via either a SOM event or SOT event of any transmitted DLPDU except that of a Probe Node (PN). If the transmit reply timer ever reaches 0 or expires, an IRQ will be generated. The transmit reply timer will remain at 0 until the IRQ is acknowledged. If the IRQ remains high, no additional message events that occur will affect the transmit reply timer until this IRQ is acknowledged.

The delegated token recovery timer is a decrementing counter. It is used for monitoring the idle time of receiving a delegated token from another device. The delegated token recovery timer works on both filtered and non-filtered received messages as well as any transmitted messages on fieldbus segment 12. When commanded to start, the delegated token recovery timer will decrement every 16 μsec. The delegated token recovery timer starting point is determined from a configurable preloaded set point loaded into one of registers 60. The decrementing of the delegated token recovery timer can be cancelled or stopped via events that are related to either a received or transmitted message. If the delegated token recovery timer ever reaches 0 or expires, an IRQ will be generated. The delegated token recovery timer will remain at 0 until this IRQ is acknowledged. If the IRQ remains high, no additional message events that may happen to occur will affect the delegated token recovery timer until this IRQ is acknowledged.

Event Order of Occurrence Management

Software is typically responsible for responding to message reception events and timer expiration events. A general difficulty in conventional systems is the time difference between the occurrence of an event in hardware, and the software's ability to become aware of the event and process it (i.e., software latency). The difficulty is further enhanced when two or more events occur before the software is able to respond. In such cases, the software may be unable to determine which event occurred first. This is problematic because the communication protocol may specify different courses of action dependent upon ordering, and in particular the ordering between message reception and timer expiration events. The present invention allows software to identify the order of occurrence between received messages and timer expiration events in the presence of software latency.

Figure 5:
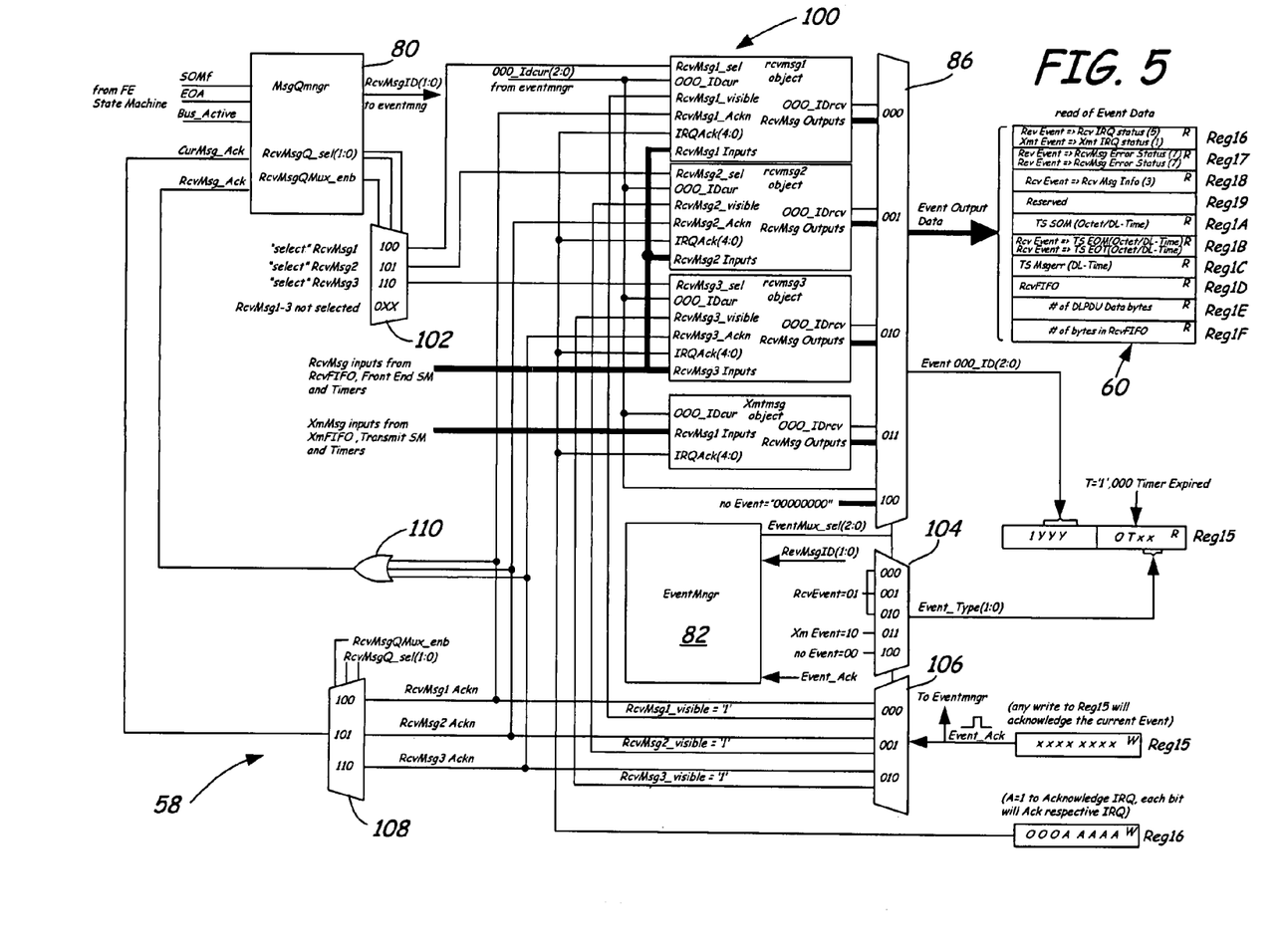
FIG. 5 is a functional block diagram of a receive/transmit event manager for processing messages received by or transmitted from a communication controller.

FIG. 5 is a functional block diagram of receive/transmit event manager 58 for processing messages received by MAU 38 or transmitted from CPU 30. Receive/transmit event manager 58 includes message queue manager (MsgQmngr) 80, event manager (EventMngr) 82, event MUX 86, received message object queue 100, and multiplexers 102, 104, 106, and 108. MsgQmngr 80 is connected to received message objects rcvmsg1, rcvmsg2, and rcvmsg3 via MUX 102. MsgQmngr 80 provides an output to EventMngr 82 via signal RcvMsgID(1:0). Received message object queue 100 includes space for three received message objects, labeled rcvmsg1, rcvmsg2, and rcvmsg3, and one transmitted message information object, labeled xmtmsg. EventMngr 82 provides a current order of occurrence identification (OOO_ID-cur) to received message objects rcvmsg1, rcvmsg2, and rcvmsg3. EventMngr 82 also provides a select input, EventMUX_sel(2:0), to event MUX 86 and MUX 104. Multiplexers 106 and 108 are outside the scope of the present invention, but are shown in FIG. 5 to illustrate the connections between the various components of receive/transmit event manager 58. MUX 106 provides an output to the received message objects and MUX 108 based on an input from register Reg15 of registers 60, and the output of MUX 108 provides an input to MsgQmngr 80. The outputs of MUX 106 also provide an input to MsgQmngr 80 via OR gate 110. Also shown in FIG. 5 is a portion (Reg15-Reg1F) of registers 60 for storing event data associated with received and transmitted message information objects for an active message. Transmit manager 84, which was shown in receive/transmit event manager 58 in FIG. 4, is omitted from FIG. 5 for clarity.

Receive/transmit event manager 58 allows CPU 30 to read the received message object (rcvmsg1, rcvmsg2, rcvmsg3) associated with each respective message that has occurred in sequence. The received message object for an active message is available for CPU 30 to read via registers 60, and in particular, in registers Reg16 through Reg1F. The transmit message object for an active message is available to MAU 38 for transmission in registers Reg16, Reg17 and Reg1B. Each received message object contains an assortment of message IRQs, errors, status, and information and data regarding receive FIFO memory 50.

EventMngr 82 manages the order of occurrence of message events. As events occur, event manager 82 assigns each event an order of occurrence identification (OOO_ID). This allows CPU 30 to read the events one at a time as they occur. CPU 30 must acknowledge each event as it occurs. After the first event has been acknowledged, the subsequent event will be ready for CPU 30 to read.

Figure 6:
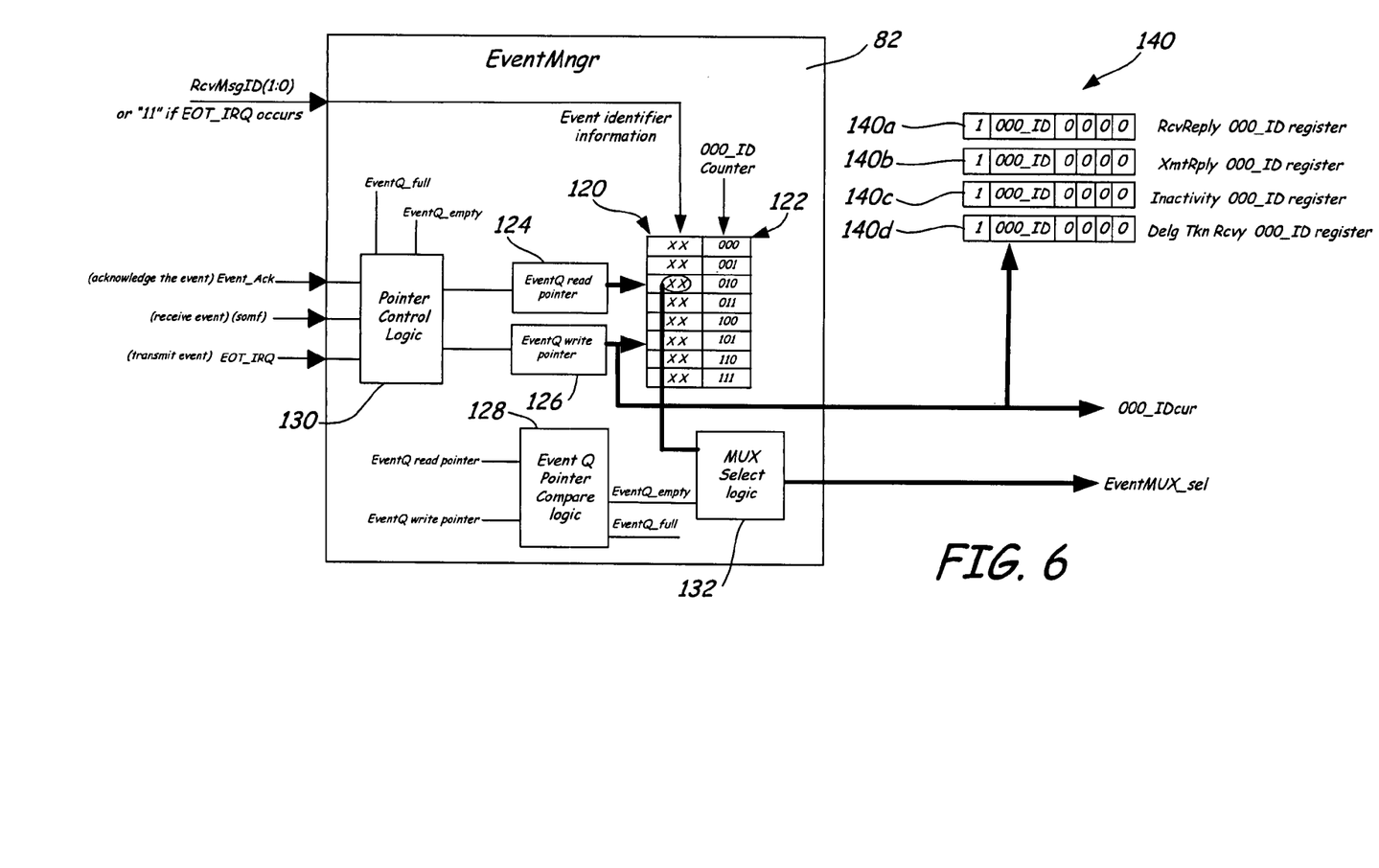
FIG. 6 is a functional block diagram of an event manager for maintaining an order of occurrence of events in a communication controller.

FIG. 6 is a functional block diagram of event manager (EventMngr) 82 for managing the order of occurrence of events in communication controller 36. EventMngr 82 includes event queue first-in-first-out memory (EventQ_FIFO) 120, OOO_ID counter 122, event queue (EventQ) read pointer 124, EventQ write pointer 126, EventQ pointer compare logic 128, pointer control logic 130, and MUX select logic 132. Also shown in FIG. 6 are timer OOO_ID registers 140, which include receive reply (RcvRply) OOO_ID register 140a, transmit reply (XmtRply) OOO_ID register 140b, Inactivity OOO_ID register 140c, and delegated token recovery (Delg Tkn Rcvy) OOO_ID register 140d.

Pointer control logic 130 controls EventQ read pointer 124 and EventQ write pointer 126. Any occurrence of either a SOMf or EOT_IRQ ecnt will increment EventQ write pointer 126, as long as EventQ_FIFO 120 is not full. Likewise, and Event_Ack commanded by software will increment EventQ read pointer 124, as long as EventQ_FIFO 120 is not empty.

EventQ pointer compare logic 128 receives the current positions of EventQ read pointer 124 and EventQ write pointer 126 as inputs and has EventQ_empty and EventQ_full as outputs. EventQ pointer compare logic 128 determines the status of both EventQ_empty and EventQ_full signals. If EventQ read pointer 124 and EventQ write pointer 126 are equal to each other, the EventQ_empty signal will be activated. If the difference of EventQ read pointer 124 and EventQ write pointer 126 equals seven ("111"), EventQ_FIFO 120 is full and the EventQ_full signal is activated. It should be noted that EventQ_FIFO 120 would likely never become full since msgQmngr 80 limits the number of pending receive messages events to three, and only one transmit message event can be pending at any one time, thus allowing a maximum of only four events queued in EventQ_FIFO 120.

As events occur in communication controller 36 (e.g., received or transmitted messages), each event is assigned an OOO_ID by EventMngr 82. The OOO_ID assigned to a particular event is determined by the value of OOO_ID counter 122 when the event occurs. At power up of process control system 10, OOO_ID counter 122 is initialized to '000.' OOO_ID counter 122 increments when an event occurs up to a value of '111', at which point OOO_ID counter 122 returns (i.e., wraps around) to '000' upon the occurrence of an event.

EventQ_FIFO 120 is a 2-bit by eight FIFO memory that sequentially stores event identifier information of each message as it occurs in communication controller 36. EventQ read pointer 124 and EventQ write pointer 126 point to locations in EventQ_FIFO 120 and maintain ordering of events processed by communication controller 36. The position of EventQ write pointer 126 is the current value of OOO_ID counter 122 (OOO_IDcur(2:0)). The position of EventQ read pointer 124 is the next event to be processed by CPU 30.

When process control system 10 is active, EventMngr 82 receives either a NewMsg signal (SOMf pulse) from a received message or an EOT_IRQ signal from a transmitted message. If an SOMf signal is detected, the current value of RcvMsgID(1:0) is stored in EventQ_FIFO 120 at the position pointed to by EventQ write pointer 126. OOO_ID counter 122 is subsequently incremented (that is, EventQ write pointer 126 is advanced to the next position in EventQ_FIFO 120). The value of RcvMsgID(1:0) is based upon the next received message object available in received message object queue 100 (as maintained by MsgQmngr 80). Thus, RcvMsgID(1:0) has a value of "00" if rcvmsg1 is the next available received message object, "01" if rcvmsg2 is the next available received message object, and "10" if rcvmsg3 is the next available received message object. If an EOT_IRQ signal occurs, a value of "11" is stored in EventQ_FIFO 120 at the position pointed to by EventQ write pointer 126 and OOO_ID counter 122 is incremented. The value of RcvMsgID(1:0) or "11" for an EOT_IRQ event are designated as event identifiers.

When event data in registers Reg16-Reg1F of registers 60 is to be processed or read by software, the event identifier stored in EventQ_FIFO 120 and the EventQ_empty signal are passed to MUX select logic 132. From MUX select logic 132, the EventMUX_sel(2:0) signal is formed. The EventMUX_sel(2:0) signal is ported out of EventMngr 82 to be used for the select control signals to EventMUX 86.

If the EventQ_empty signal is low (i.e., one or more events are queued in EventQ_FIFO 120), MUX 104 provides an Event_Type(1:0) signal to Reg15(1:0). Event_Type(1:0) is either '01' for a received message or '10' for a message to be transmitted. Event MUX 86 also multiplexes the OOO_ID value pointed to by EventQ read pointer 124 into Reg15(6:4). Event MUX 86 further multiplexes event data (e.g., message IRQs, errors, and status information) from the message information object corresponding to the EventMUX_sel(2:0) signal to registers Reg16-Reg1F for processing by software. After the event data has been read by software, an event acknowledge signal (Event_Ack pulse) is submitted by the software to EventMngr 82. The Event_Ack signal increments the position of EventQ read pointer 124 in EventQ_FIFO 120.

If the EventQ_empty signal is high, a '00' is multiplexed to Reg15(1:0) by MUX 104, indicating to the software that no event is available for processing. Event MUX 86 concurrently multiplexes the current OOO_ID value pointed to by EventQ read pointer 124 into Reg15(6:4). If EventQ_FIFO 120 is empty (EventQ_Empty=1), pointer control logic 130 will prevent any further Event_Ack signals from incrementing EventQ read pointer 124.

Timers 68 (as shown and described with regard to FIG. 4) include four timers that are associated with the sequencing of events. These timers are considered order of occurrence (OOO) timers, which include the receive reply timer, and the transmit reply timer, the inactivity timer, and the delegated token timer. When any of the OOO timers expires, an IRQ is generated specific for that timer. The timer expiration IRQs for the four OOO timers are passed through a logic OR gate, and the output of this OR gate is stored in bit two of Reg15 (as shown in FIG. 5). Thus, when none of the OOO timers have expired, a "0" is maintained in Reg15(2). When any one of the OOO timers expires, a "1" is stored in Reg15(2). This allows software to determine whether a timer expiration event has occurred when reading register Reg15 to process the next event in EventQ_FIFO 120.

The OOO timers are decrementing timers that are each associated with a timer OOO_ID register 140 in registers 60. In particular, the receive reply timer is associated with Rcv Reply OOO_ID register 140a, the transmit reply timer is associated with Xmt Reply OOO_ID register 140b, the inactivity timer is associated with Inactivity OOO_ID register 140c, and the delegated token recovery timer is associated with Delg Tkn Rcvy OOO_ID register 140d.

When an OOO timer is active (i.e., decrementing), a '000' is maintained in bits 6 through 4 of timer OOO_ID register associated with the OOO timer. If an OOO timer expires, an IRQ for the expired timer occurs, and the value of OOO_ID counter 122 when the timer expires (OOO_IDcur(2:0)) is copied into bits 6 through 4 of timer OOO_ID register 140 associated with the expired timer. For example, if the inactivity timer expires, the value of OOO_IDcur(2:0) is copied into bits 6 through 4 of Inactivity OOO_ID register 140c.

As described above, the communication protocol may specify different courses of action depending on the ordering between message and timer expiration events. In the case where both a message event and a timer expiration event occur before software is able to respond, the software refers to the value of OOO_ID copied to timer OOO_ID register 140 of the expired timer and the OOO_ID associated with the message event in EventQ_FIFO 120 to determine whether the message event or the timer expiration event occurred first. If the value of OOO_ID in timer OOO_ID register 140 of the expired timer and the value of OOO_ID associated with the message event are the same, the timer expired before the value of OOO_ID counter 122 was assigned to the message event. That is, the timer expired before the message event occurred. On the other hand, if the value of OOO_ID in timer OOO_ID register 140 of the expired timer is different from the value of OOO_ID associated with the message event, the timer expired after the value of OOO_ID counter 122 was assigned to the message event. In other words, the timer expired after the message event occurred.

In summary, software is typically responsible for responding to message reception events and timer expiration events. A general difficulty in conventional systems is the time difference between the occurrence of an event in hardware, and the software's ability to become aware of the event and process it. The present invention is a communication controller for use in a device for maintaining an order of occurrence of events received from and transmitted to a communication medium. The communication controller includes an order of occurrence identification (OOO_ID) counter and an event queue memory. The event queue memory sequentially stores an event type identifier for each event that is processed by the communication controller. The OOO_ID counter provides an OOO_ID to associate with each event type identifier. In a preferred embodiment, the communication controller further includes a plurality of timer OOO_ID registers. Each timer OOO_ID register is associated with an order of occurrence (OOO) timer in the communication controller. When one of the OOO timers expires, the current value of OOO_ID from the OOO_ID counter is stored in its associated timer OOO_ID register. Software then determines the order of occurrence between an event and the expiration of an OOO timer by comparing the OOO_ID value of the event with the OOO_ID stored in the timer OOO_ID register.

Although the present invention has been described with reference to preferred embodiments, workers skilled in the art will recognize the changes may be made in form and detail without departing from the spirit and scope of the invention.

The invention claimed is:

1. A device for communicating over a communication medium, the device comprising:
   a medium attachment unit (MAU) for receiving and transmitting messages on the communication medium;
   a central processing unit (CPU) for processing data contained in messages received and creating data to be contained in messages to be transmitted; and
   a communication controller for interfacing between the MAU and the CPU, the communication controller for processing events received from or transmitted to the communication medium and including an order of occurrence identification (OOO_ID) counter and an event queue memory, the event queue memory for sequentially storing an event type identifier for each event, the OOO_ID counter is incremented when an event is received from or transmitted to the communication medium and provides an OOO_ID count value associated with each event type identifier, the communication controller further including a plurality of order of occurrence (OOO) timers and a plurality of timer OOO_ID registers, each timer OOO_ID register associated with one of the plurality of OOO timers, wherein when an OOO timer expires, a current OOO_ID count value from the OOO_ID counter is stored in its associated timer OOO_ID register.

2. The device of claim 1, wherein the CPU determines an order of occurrence between an event and an OOO timer expiring by comparing the OOO_ID count value associated with the event with the OOO_ID count value stored in the timer OOO_ID register associated with the expired OOO timer.

3. The device of claim 1, wherein the communication controller further comprises
   a register which stores information related to an active event being processed by the CPU, the information including the OOO_ID count value associated with the active event, the event type identifier for the active event, and an OOO timer status bit for indicating whether any of the plurality of OOO timers has expired.

4. The device of claim 1, wherein the OOO timers include a receive reply timer, a transmit reply timer, an inactivity timer, and a delegated token recovery timer.

5. The device of claim 1, wherein the events include messages received from and transmitted to the communication medium.

6. A communication controller for maintaining an order of occurrence of events in a process control system, the communication controller comprising:
   a first-in-first-out (FIFO) memory for sequentially storing an event type identifier for each event; and
   an order of occurrence identification (OOO_ID) counter for providing an OOO_ID count value to associate with each event type identifier, wherein the OOO_ID counter is incremented when an event occurs in the communication controller;
   a plurality of order of occurrence (OOO) timers; and
   a plurality of timer OOO_ID registers, each timer OOO_ID register associated with one of the plurality of OOO timers, wherein a current OOO_ID counter value is stored in its associated timer OOO_ID register when an OOO timer expires.

7. The communication controller of claim 6, wherein a current OOO_ID count value is maintained by an event queue write pointer associated with the OOO_ID counter, wherein the event queue write pointer is incremented when an event occurs in the communication controller.

8. The communication controller of claim 7, further comprising:
   means for preventing the event queue write pointer from incrementing when the FIFO memory is empty.

9. The communication controller of claim 6, further comprising:
   an active event register which stores information related to an active event being processed by software, the information including the OOO_ID count value associated with the active event, the event type identifier for the active event, and an OOO timer status bit for indicating whether any of the plurality of OOO timers has expired.

10. The communication controller of claim 9, wherein the OOO_ID count value stored in the active event register and the OOO_ID count value stored in the timer OOO_ID register associated with an expired OOO timer establish an order of occurrence between the active event and an OOO timer expiring.

11. The communication controller of claim 6, wherein the OOO timers include a receive reply timer, a transmit reply timer, an inactivity timer, and a delegated token recovery timer.

12. A method for determining an order of occurrence of events in a communication device, the method comprising:
   storing sequentially an event type identifier for each event in a first-in-first-out (FIFO) memory;
   incrementing the OOO_ID counter when an event occurs in the communication device;
   associating a current count value of an OOO_ID counter with the event type identifier;
   providing a plurality of order of occurrence (OOO) timers and a plurality of timer OOO_ID registers, each timer OOO_ID register associated with one of the plurality of OOO timers;
   storing a current count value of the OOO_ID counter in a timer OOO_ID register when its associated OOO timer expires; and
   comparing the OOO_ID associated with the event with the OOO_ID stored in the timer OOO_ID register associated with the expired OOO timer.

13. The method of claim 12, wherein the OOO timer expired before the event occurred if the OOO_ID associated with the event is equal to the OOO_ID stored in the timer OOO_ID register, and wherein the OOO timer expired after the event occurred if the OOO_ID associated with the event is not equal to the OOO_ID stored in the timer OOO_ID register.

14. The method of claim 12, wherein incrementing the OOO_ID counter comprises advancing an event queue write pointer to a next position in the FIFO memory.

15. The method of claim 12, wherein the events include messages received from and transmitted to a communication medium by the communication device.

* * * * *